United States Patent [19]

Watanabe

[11] 4,134,505
[45] Jan. 16, 1979

[54] WORK VEHICLE WITH A FLUID PRESSURE CIRCUIT SYSTEM

[75] Inventor: Makoto Watanabe, Izumi, Japan

[73] Assignee: Kubota, Ltd., Japan

[21] Appl. No.: 778,546

[22] Filed: Mar. 17, 1977

[30] Foreign Application Priority Data

Sep. 8, 1976 [JP] Japan .............................. 51-121749[U]

[51] Int. Cl.$^2$ ............................................... E02F 3/32
[52] U.S. Cl. .................................. 214/138 F; 60/484;
91/512; 214/138 R
[58] Field of Search ............... 214/132, 138 R, 138 D,
214/138 E, 138 F, 138 G, 762; 91/412, 437,
449; 60/484

[56] References Cited

U.S. PATENT DOCUMENTS

| | | | |
|---|---|---|---|
| 2,722,102 | 11/1955 | Pilch | 214/138 E X |
| 3,156,098 | 11/1964 | LaRou | 214/138 R X |
| 3,172,552 | 3/1965 | Metailler | 214/138 R |
| 3,922,855 | 12/1975 | Bridwell et al. | 214/138 R X |
| 4,007,845 | 2/1977 | Worback | 214/138 D |
| 4,030,623 | 6/1977 | Bridwell et al. | 214/138 R |

FOREIGN PATENT DOCUMENTS

161295 6/1964 U.S.S.R. ................................. 214/138 F

*Primary Examiner*—L. J. Paperner
*Attorney, Agent, or Firm*—McGlew and Tuttle

[57] ABSTRACT

A work vehicle with a fluid pressure circuit system comprising an actuator pump, a work equipment mounted on the vehicle and adapted to swivel on a vertical axis, a fluid pressure circuit connected to the actuator pump to actuate the work equipment, and a drive for swivelling the whole of the work equipment. A fluid pressure circuit portion of the fluid pressure circuit is connected to the actuator pump and to the drive to actuate the drive and a control valve is provided on the fluid pressure circuit for actuating the drive. A by-pass route is connected to a supply route and a discharge route of the circuit, at a portion of the fluid pressure circuit between the control valve and the drive. The arrangement is adapted to permit part of the fluid supplied by the actuator pump to short-circuit by way of the by-pass route and smooth the operation of the work equipment.

1 Claim, 3 Drawing Figures

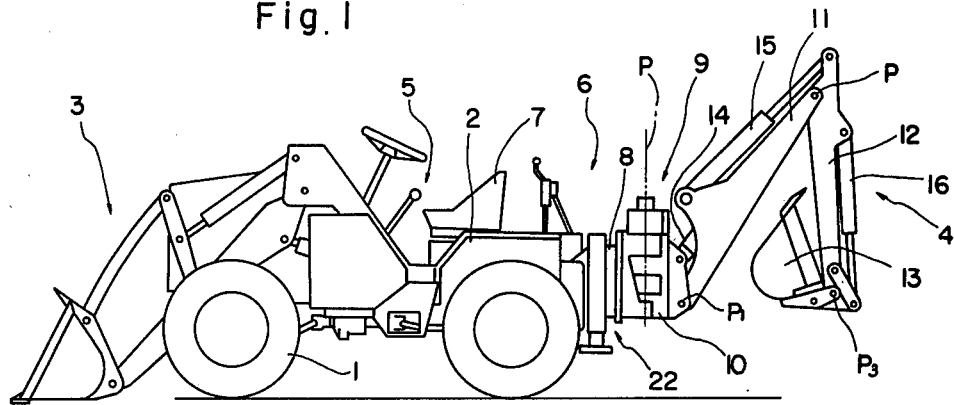
Fig. 1
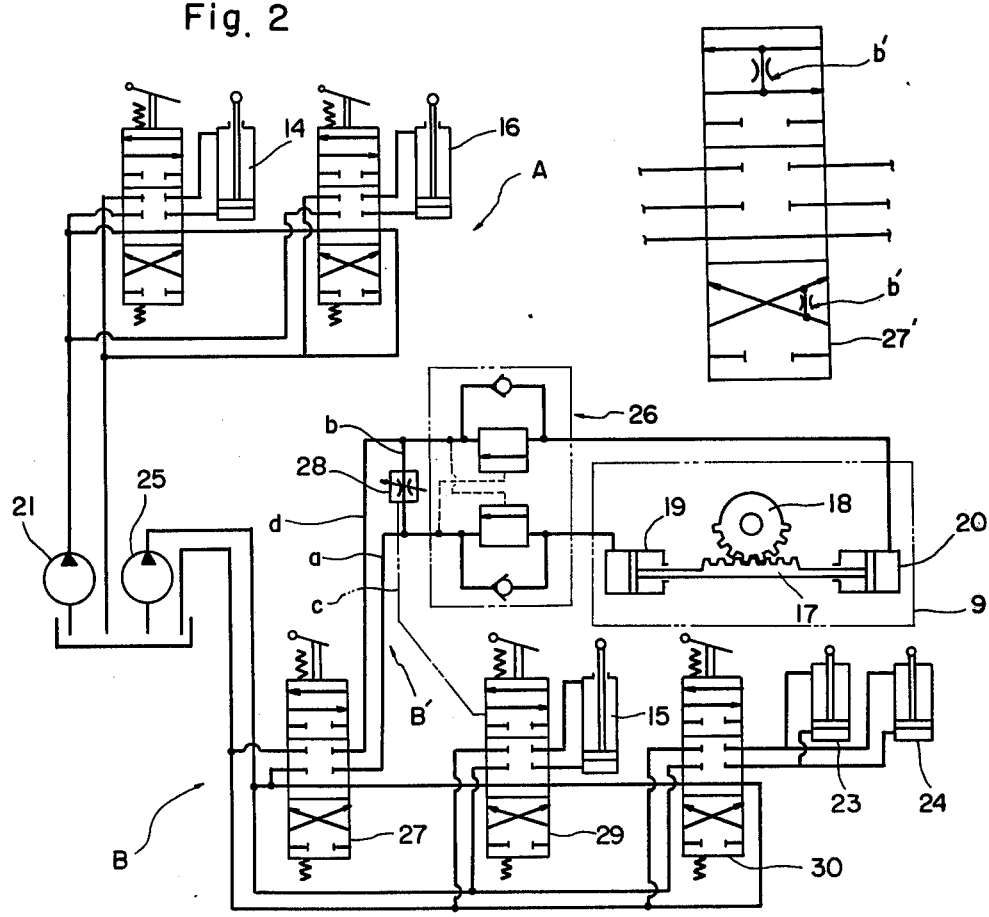
Fig. 2
Fig. 3

WORK VEHICLE WITH A FLUID PRESSURE CIRCUIT SYSTEM

BACKGROUND OF THE INVENTION

The present invention relates to a work vehicle having a fluid pressure circuit system for a backhoe structure and the like which comprises a vertically oscillatable arm mounted on a swivel deck and a flection arm connected to the tip end of the oscillatable arm and carrying an oscillatable bucket. More particularly, the invention is directed to a work vehicle having a fluid pressure circuit system that is arranged to cause the swivelling of a work equipment, such as an arm assembly on a vertical axis with the pump means for the vertical oscillation or reflection of the arm.

In the case of using a common pump means to supply fluid pressure both for the vertical oscillation or reflection of the work equipment and for the swivelling of the work equipment as above described, the pump means needs to have a large capacity to actuate the work equipment at high speed. For this reason, when the work equipment is only swivelled, the swivelling speed is unnecessarily high, which brings about a disadvantage of subjecting the work equipment to a great shock at the start and hault of the swivelling.

In order to overcome such a disadvantage, a conventional method employs a throttle valve on the fluid pressure circuit for the swivelling of the work equipment. However, this entails a further problem by causing the relief valve adapted for pressure determination to operate easily, which will result in a rise in the fluid temperature, noises and a great power loss.

SUMMARY OF THE INVENTION

It is an object of the present invention to provide a work vehicle with a fluid pressure circuit system capable of causing the swivelling of the work equipment in a desirable state which is free of the above noted disadvantages.

With such object in view, a work vehicle with a fluid pressure circuit system according to the present invention comprises actuator pump means, a work equipment mounted on the vehicle and adapted to swivel on a vertical axis, a fluid pressure circuit connected to the actuator pump means to actuate the work equipment, drive means for swivelling the whole of the work equipment, a fluid pressure circuit portion provided to connect the actuator pump means and the drive means to actuate the drive means, a control valve provided on the fluid pressure circuit portion for actuating the drive means, and a by-pass route for a portion of the fluid pressure circuit between the control valve and the drive means.

The above arrangement is capable of permitting part of the pressure fluid supplied into the fluid pressure circuit for the swivelling of the work equipment to short-circuit by way of the fluid discharge route, whereby the work equipment is swivelled by the drive means which receives a substantially reduced supply of the pressure fluid. Since the pressure fluid supplied by the actuator pump means is made to circulate without change in its volume, the arrangement is free of a rise in the fluid temperature attributable to the operation of a relief valve. It also realizes a reduced swivel speed of the work equipment creating no shock or noise at the start and at the hault of the swivelling and at the same time checking power loss. The arrangement allows for the gradual acceleration of the work equipment.

A further object of the present invention is, therefore, to provide for adjustment of the swivelling speed of the work equipment.

Other objects and advantages of the present invention will be apparent from the following description.

BRIEF DESCRIPTION OF THE DRAWINGS

In the drawings illustrating a work vehicle with a fluid pressure circuit system according to the present invention:

FIG. 1 is a side elevation of a work vehicle;

FIG. 2 is a diagram of the fluid pressure circuit system; and

FIG. 3 is a diagram of a control valve circuit of another embodiment.

DESCRIPTION OF THE PREFERRED EMBODIMENTS

Referring now to FIG. 1, an example of work vehicles used in the invention is a shovel vehicle carrying a backhoe comprises a vehicle body 2 which has a wheel propelling system 1, a vertically oscillatable shovel equipment 3 disposed at the front of vehicle body 2, and a backhoe equipment 4 disposed at the rear end of vehicle body 2. The work vehicle is further provided with a swivel seat 7 for the operator to work at operating boxes 5 and 6 associated respectively with shovel equipment 3 and backhoe equipment 4. The work equipment thus may be provided with a plurality of functions such as the wheel propelling system 1, the shovel oscillation equipment 3 and the backhoe equipment 4. Two outriggers 22 are provided on the vehicle which are actuated with hydraulic cylinders 23, 24 (FIG. 2).

The backhoe equipment 4 comprises a bracket 8 whose position can be changed transversely in relation to the vehicle body 2, a swivel bracket 10 adapted to be actuated by drive means 9 to swivel relative to bracket 8 on a vertical axis P, a first arm 11 adapted to vertically oscillate relative to swivel bracket 10 on a horizontal axis $P_1$, a second arm 12 adapted to reflect relative to first arm 11 on a horizontal axis $P_2$, an oscillatable bucket 13 disposed at the tip end of the second arm 12 and pivotal about a horizontal axis $P_3$, and hydraulic cylinders 14, 15 and 16 to actuate the first and second arms 11, 12 and bucket 13.

Referring now to FIG. 2, drive means 9 comprises a rack 17 and a pinion 18, and two single acting cylinders 19, 20 for reciprocating the pinion 18 in the longitudinal direction of the rack 17.

The hydraulic circuit arrangement for backhoe 4 is now described with further reference to FIG. 2. Hydraulic cylinders 14, 16 for the first arm 11 and the bucket 13 are driven by means of hydraulic circuit A leading from a first actuator pump means 21, hydraulic cylinders 15, 23, 24 for the second arm 12 and two outriggers 22 and hydraulic drive means 9 for actuating the swivel bracket 10 are driven by means of a fluid pressure circuit or hydraulic circuit B leading from a second actuator pump means 25 for supplying and discharging fluid for a plurality of work vehicle functions. To describe hydraulic circuit B in more detail, this circuit B includes a fluid pressure circuit portion or hydraulic circuit portion B' connected between the above-mentioned drive means 9 and second actuator pump means 25 by way of control valve 27. Circuit B' is provided with a counterbalance valve 26. Between counterbalance valve 26 and control valve 27 for the cylinders 19, 20, and associated with drive means 9 is disposed a by-pass route or line b provided with a variable throttle valve 28 which is connected between a supply route or line a and a discharge route or line d. A control valve 29 for the second arm 12 and a control valve 30 for outriggers 22 are in parallel connection with control valve 27 for drive means 9. When the backhoe equipment 4 is made to swivel in association with swivel bracket 10, part of the pressure oil supplied by the second pump means 25 into the hydraulic circuit B' to actuate drive means 9 will short-circuit by flowing through by-pass route b into discharge route d. This will result in a substantial reduction of oil supply pressure directed to the swivelling function, whereby the swivelling speed of the backhoe equipment 4 is lowered.

It should be understood from the foregoing description that in a fluid pressure circuit, namely a hydraulic circuit, according to the present invention a desired result can be obtained also by an arrangement in which the hydraulic circuit including a by-pass route b, for actuating drive means 9, is connected to hydraulic circuit A to actuate the first arm 11 and bucket 13 of backhoe equipment 4. It is clear too that the purposes of the present invention will be satisfied by a circuit arrangement in which the elements connected to hydraulic circuit A and the elements connected to hydraulic circuit B are exchanged.

Furthermore, it may be arranged so that by-pass route b is shut by a mechanical, electrical or hydraulic means, in reversible association with the second arm control valve 29, as indicated by a phantom line in FIG. 2. Such arrangement causes the shortcircuit of part of the pressure oil separately supplied when oscillation of the second arm 12 and swivelling of the whole backhoe equipment 4 occur at the same time. This will prevent backhoe equipment 4 from swivelling at an unnecessarily slow speed, hence a higher work efficiency.

Further, as shown in FIG. 3, by-pass routes b', b' may be incorporated into control valve 27' on the pressure fluid supply route. A fixed throttle valve may be employed in place of variable throttle valve 23, or the throttle valve may be omitted altogether.

It is possible to use a fluid other than pressure oil in the arrangement above described.

What I claim is:

1. A work vehicle having a plurality of functions and including a work equipment pivotally mounted on a vertical axis on the work vehicle comprising:

drive means connected to the work equipment for pivoting the work equipment on the work vehicle, actuator pump means for supplying and discharging fluid for the plurality of functions connected to said drive means for supplying fluid toward and discharging fluid away from said drive means, a supply line connected between said actuator pump means and said drive means for supplying fluid toward said drive means, a discharge line connected between said actuator pump means and said drive means for discharging fluid away from said drive means, a control valve line connected between said actuator pump means and said drive means in said supply and discharge lines, a by-pass line connected between said supply line and said discharge line at a location between said control valve and said drive means for permitting a portion of fluid supplied toward said drive means by said actuator pump means through said supply line to flow directly to said discharge line whereby said drive means is actuated smoothly by a remaining portion of the fluid supplied toward said drive means by said actuator pump means, a variable throttle valve in said by-pass line for varying the portion of fluid flowing therethrough, the work vehicle having a further drive means for actuating a further function thereof, said actuator pump means connected to said further drive means, a further control valve connected between said actuator pump means and said further drive means for controlling said further drive means, said further control valve being connected to said variable throttle valve for varying the flow through said by-pass line in accordance with the control of said further control valve on said further drive means whereby a reduced flow of fluid through said bypass line is effected to increase the fluid flow to said drive means when said further drive means is activated by said further control valve.

* * * * *